United States Patent
Taylor

[15] 3,695,273
[45] Oct. 3, 1972

[54] FOOD PROCESSING APPARATUS

[72] Inventor: George F. Taylor, P.O. Box 625, Moultrie, Ga. 31768

[22] Filed: Nov. 23, 1970

[21] Appl. No.: 91,662

[52] U.S. Cl. .................130/30 G, 146/1, 146/DIG. 8
[51] Int. Cl. .......................................................A01d
[58] Field of Search.........130/30 G; 248/19, 23, 224, 248/225; 74/242.13 R, 242.13 A, 242.14 R, 242.14 A, 242.14 B; 146/DIG. 8

[56] References Cited

UNITED STATES PATENTS

| | | | |
|---|---|---|---|
| 2,803,254 | 8/1957 | Wood | 130/30 G |
| 2,524,519 | 10/1950 | Daub | 130/30 G |

*Primary Examiner*—Antonio F. Guida
*Attorney*—Newton, Hopkins & Ormsby

[57] ABSTRACT

A food processing apparatus capable of separating peas, beans or the like from their pods during a processing operation. The food processing apparatus includes a support base having a number of releasable connecting elements and an operable drive means. A processing unit is provided having a number of releasable connecting elements complementary to and detailed for connecting engagement with the connectable elements on the base support means. The processing unit includes a pair of oppositely drive roller elements defining a nip therebetween for separating peas from pods in response to a pod being advanced therethrough in a processing operation. One of the rollers is of larger diameter than the other roller and the rollers are driven whereby the peripheral speed of one roller is greater than the peripheral speed of the other roller. At least one of said rollers is elliptical in cross-section whereby the nip defined between the rollers will be cyclically increased and decreased in a processing operation.

14 Claims, 5 Drawing Figures

INVENTOR.
GEORGE F. TAYLOR
BY
Newton, Hopkins, & Ormsby
ATTORNEYS

FOOD PROCESSING APPARATUS

BACKGROUND OF THE INVENTION

This invention relates to an apparatus for processing a food product and more particularly to an improved food processing apparatus for separating the fruit from podded vegetables such as peas, beans or the like.

A large number of people are involved in the growing of vegetables for home use and a number of these people grow an extra amount of vegetables which they sell to realize a portion or, sometimes, all of their income.

One problem with the growing of podded type vegetables such as peas, beans or the like is the manual labor required in separating the fruit from the podded vegetables to produce an edible food product. In order for a person growing peas, beans or the like for sale, it was necessary to shell or hull the peas in order to find a buyer for the vegetables. In the past, most of the family-grown podded type vegetables were shelled or hulled manually which was costly and consumed a large amount of time.

There have been numerous attempts made to provide a small operable food processing unit for home use which would be capable of separating peas, beans or the like from their pods. However, most of the prior art units capable of effectively separating peas or beans from the pods were often complex in construction, uneconomical to manufacture, and unreliable in operation.

In providing a food processing means for home use, a number of food processing units are desirable to effectively perform the various functions desired to completely produce edible food products. One type of processing unit required is a pea or bean sheller as identified above. Another type of processing unit which is normally used is a grinding or slicing unit of some type which is used to perform still other food processing functions around the home. In each of the food processing units utilized in a home, it is desirable to have a power motor means for effecting operation thereof. In the past, it has been necessary to have a separate power motor means for each of the processing units. The provision of a separate power motor means for each processing unit would greatly increase the cost in providing the various food processing apparatus which are desirable for use in food processing operations.

SUMMARY OF THE INVENTION

The above disadvantages of the prior art food processing apparatus are overcome by the present invention which basically includes a base support means having a power motor drive means and a number of releasable connecting elements. The releasable connecting elements on the base support means are detailed for releasable connecting engagement with a number of complementary connecting elements provided on a food processing unit, such as a pea shelling apparatus. The releasable connecting elements on the base support means and on the food processing unit are detailed to restrict or limit the movement of the food processing unit relative to the base support means in one direction of movement when in a connected relationship. The food processing unit includes an operable driven means. A power transfer means is operatively connected to the base support power drive means and the food processing unit driven means. The power transfer means is detailed to restrict movement of the food processing unit in the limited direction of movement relative to the base support means when connected in driving engagement to thereby maintain the food processing unit on the base support means. The food processing unit of the present invention takes the form of a pea shelling apparatus which includes a pair of rollers supported in spaced parallel relationship to define a nip therebetween and operable for drawing a podded vegetable therethrough. The rollers and nip therebetween are detailed to separate peas or beans from their pod in response to the pod passing therethrough. One of the rollers is detailed such that the roller is elliptical in cross-section to present a long axis and a short axis and one of the rollers is larger than the other roller whereby the peripheral speeds between the surface of the two rollers will be different to effect a twisting action of a padded vegetable passing therethrough to improve the shelling characteristics of the roller action.

It is therefore a primary object of this invention to provide a food processing apparatus which is capable of releasably maintaining and operating a number of food processing units.

Another object of this invention is to provide a food processing apparatus having releasable complementary connecting elements which are maintained in a connected relationship by means of a power transfer means.

A further object of this invention is to provide a food processing apparatus which will effectively and satisfactorily separate peas, beans or the like from their pods in a processing operation.

A still further object of this invention is to provide a pea shelling apparatus which will provide a twisting action to the pod to improve the shelling characteristics.

Still another object of this invention is to provide a pea shelling apparatus having a cyclically expandable and retractable nip defined between a pair of pea shelling rollers.

Another object of this invention is to provide a food processing unit which is readily disassembled for a cleaning operation.

An additional object of this invention is to provide a food processing apparatus which is simple in construction, economical to manufacture and reliable in operation.

Still other objects and advantages of the details of construction will become apparent upon reading the following description of the illustrative embodiment of the invention with reference to the attached drawings wherein like reference numerals have been used to refer to like parts throughout the several figures, and wherein:

DESCRIPTION OF THE ILLUSTRATIVE EMBODIMENT

Figure 1:
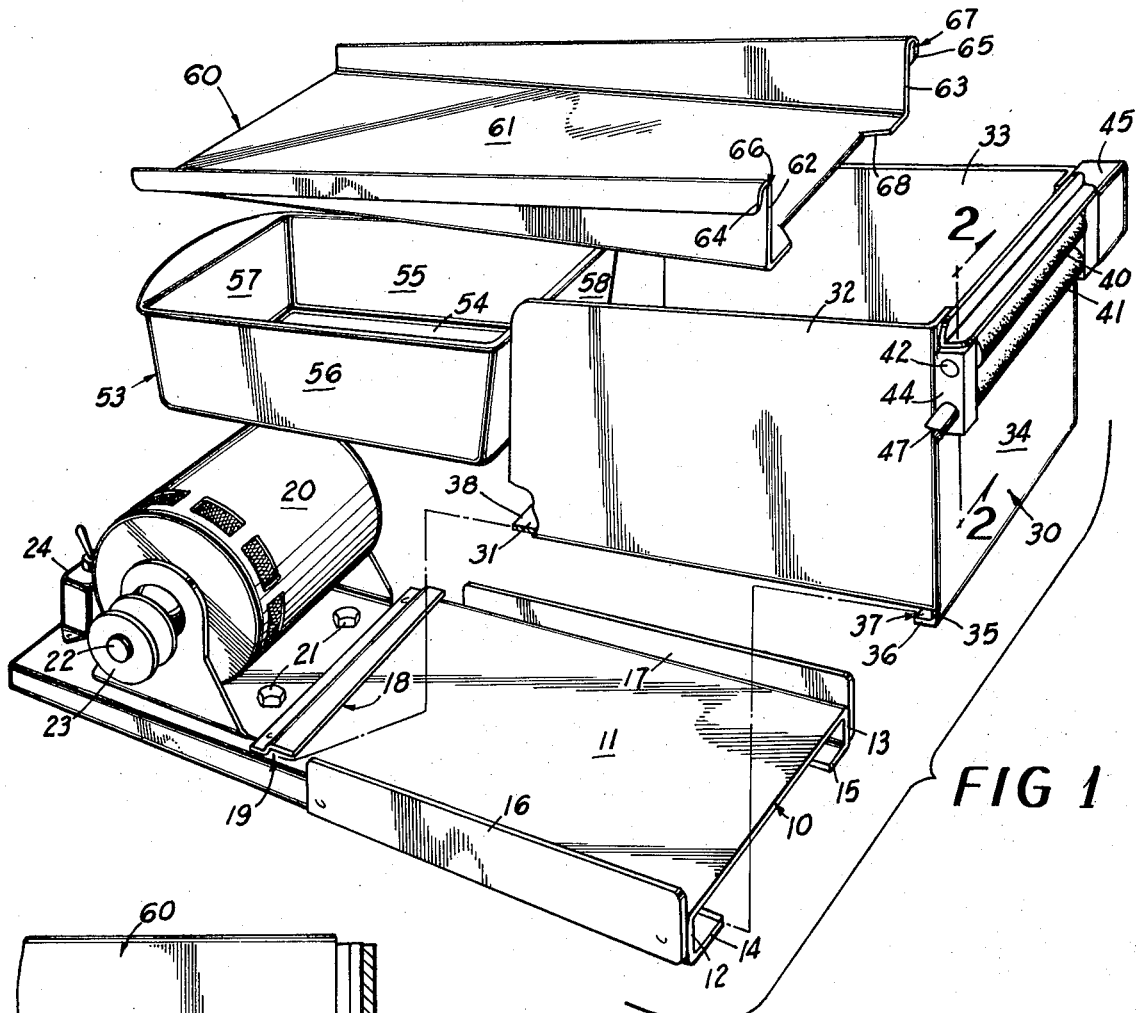
FIG. 1 is an exploded perspective view of the food processing apparatus of the present invention with certain portions broken away and shown in section for purpose of clarity.

Referring now to the drawings, the food processing apparatus of the present invention will be described with reference to a base support means 10 and a food processing unit 30.

The base support means 10 includes an elongated substantially channel shaped structure having a top supporting surface 11. The top supporting surface 11 is provided with a pair of downwardly directed leg portions 12, 13 provided along the lateral edges thereof. Legs 12, 13 include inwardly directed substantially horizontal support flanges 14, 15, respectively as shown in FIG. 1. A pair of upstanding guide members 16, 17 are connected to the leg members 12, 13, respectively, and extend a slight distance above the flat supporting surface 11. The guide members 16, 17 are detailed to extend to the left as shown in FIG. 1, along the base support member 10 to an intermediate portion thereof.

Mounted on the upper support surface 11 of the base support means is a socket type releasable connectible element 18. The connectible element 18 is mounted on and extends across the base surface 11 at substantially right angles to the longitudinal axis of the base support means 10. Socket type connectible element 18 is formed to provide a recess notch portion 19 defined between the socket element 18 and the upper surface 11 of the base support means.

As shown in FIG. 1, the base support means 10 includes a power motor drive means 20 mounted thereon by conventional threaded bolt connecting means 21 which are inserted through openings (not shown) in the motor base means and the base support member 10. Motor 20 is of conventional construction and is provided with a drive shaft 22 having a pulley means 23 fixed thereto for effecting a transfer of a drive to the processing unit, as will be described in more detail herein below. Operation of the motor 20 is effected by means of a conventional electrical power supply means through a control switch 24.

Figure 4:
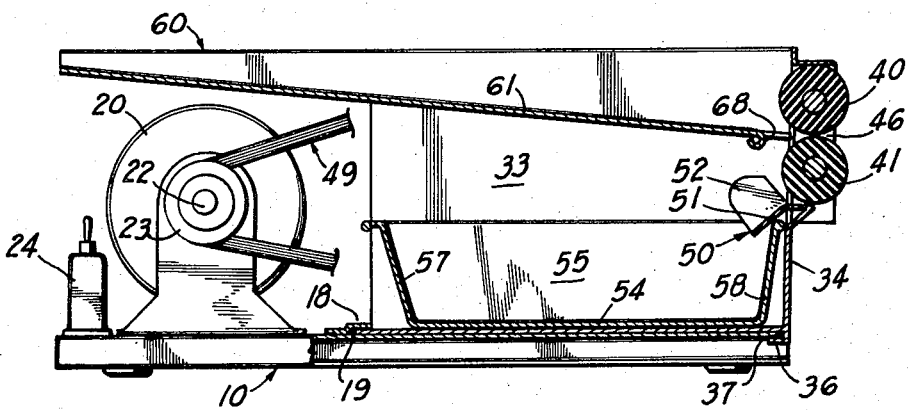
FIG. 4 is a partial vertical sectional view taken substantially longitudinally through a mid portion of the assembled processing apparatus shown in FIG. 3.

The food processing unit 30 includes an upwardly and rearwardly opened housing formed by a bottom plate 31, a pair of upwardly extending sides 32, 33 and an end member 34. The sides 32, 33 and end member 34 are formed as an integral member with the sides being bent to be substantially parallel to the side edges of the bottom plate 31. The sides 32, 33 and the end member 34 are connected to the base member 31 by conventional means such as welding (not shown). As shown in FIGS. 1 and 4, the end member 34 includes a downwardly extending portion 35 having an in-turned lip 36. The downwardly extending member 35 and lip 36 is detailed in position relative to the bottom surface of plate 31 to provide a socket receiving portion 37 therebetween. The left edge portion 38 of the floor member 31 is detailed in dimensions to be complementary to the socket portion 19 formed on the base support member 10 whereby the end portion of floor member 31 can be releasably inserted within the socket 19.

The socket receiving portion 37 defined between lip 36 and the bottom of plate 31 is detailed to be complementary to the right extended edge portion of the upper surface 11 of the base support member 10, whereby the end portion of the upper surface 11 can be releasably received within the socket 37. When edge portion 38 of floor plate 31 is engaged within the socket 19 and the right edge of surface 11 is engaged within socket 37 the food processing unit 30 is maintained on the support base 10 and restricted from movement in all directions except translating movement to the right as shown in FIGS. 1 and 4.

The socket receiving portions 19, 37 and extended surface portions 38, 11 are detailed to be readily and releasably engageable with each other whereby the food processing unit 30 can be easily disassembled from the support base 10.

Figure 2:
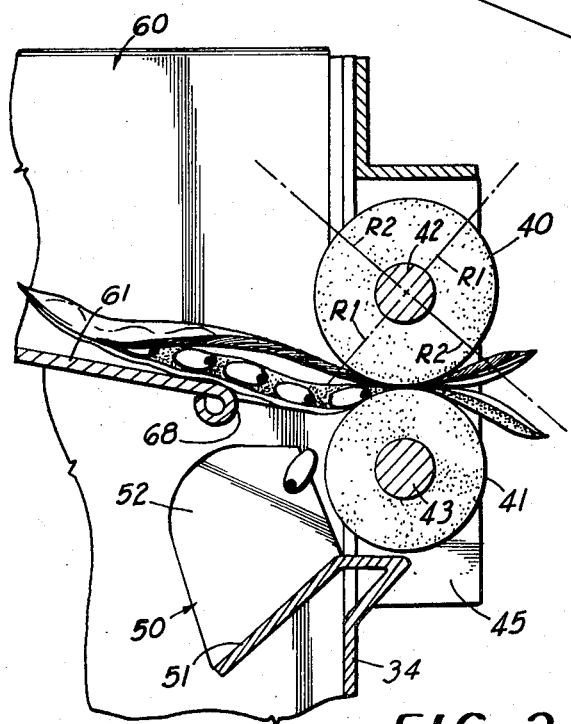
FIG. 2 is an enlarged vertical sectional view taken along lines 2—2 of FIG. 1.

As shown in FIG. 1 and 2, the food processing unit includes a pair of rollers 40, 41. Rollers 40, 41 are constructed of a resilient material and are fixed to shafts 42, 43, respectively, with extended end portions being journaled by conventional bearing support means 44, 45. The bearing support means 44, 45 are attached to the upper edge of processing unit end member 34, as shown in FIG. 1. Upper roller 40 is slightly larger in diameter than the bottom roller 43. Also, roller 40 is formed to be substantially elliptical in cross-section whereby roller 40 includes a first smaller radius R-2 and a second longer radius R-1. The rollers 40, 41 are supported in substantially parallel relationship relative to each other to define a nip 46 therebetween for allowing a podded vegetable to be advanced therethrough in a food processing operation.

Rollers 40, 41 are supported by bearing support means 44, 45 whereby one of the rollers can be adjusted relative to the other roller to increase or decrease the nip 46. The adjusting means for adjusting the nip 46 is of conventional construction not shown herein, and reference is made to applicant's prior U.S. Pat. No. 3,238,950 issued Mar. 8, 1966 for the details of construction of an adjusting mechanism for varying the spacing between adjacent parallel rollers to increase or decrease the nip defined therebetween.

Figure 3:
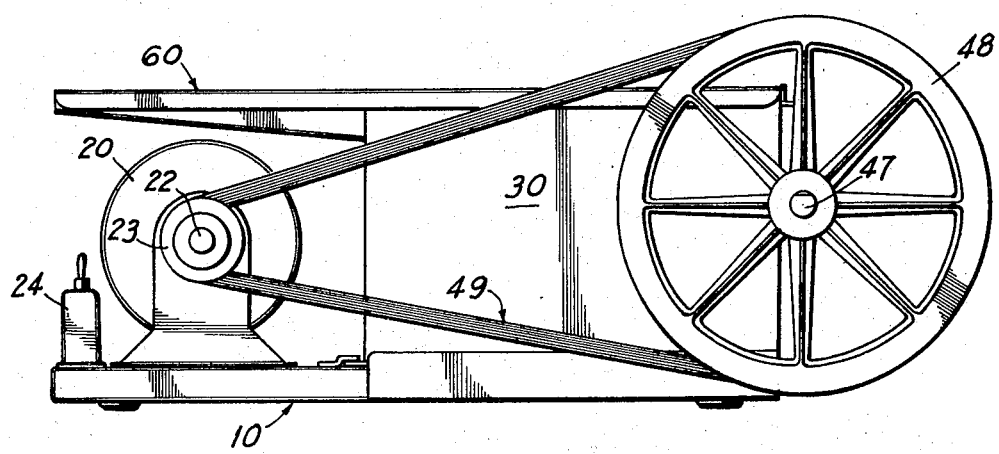
FIG. 3 is a side elevational view of the food processing apparatus of the present invention in an assembled relationship.

Lower roller 41 is provided with an extended shaft portion 47 having mounted thereon a drive pulley means 48. Drive from the power motor means 20 is delivered to the roller drive pulley 48 by means of an endless belt transfer means 49. In the assembled relationship as shown in FIG. 3, the endless transfer belt 49 is detailed in dimensions to effect a drive transfer from the motor pulley 23 to the roller drive pulley 48. Further, the belt dimensions 49 are detailed to maintain or restrict the food processing unit 30 from moving to the right, as shown in FIG. 3. A restriction of the rightward movement of the food processing unit 30 will maintain the socket portions 19, 37 in connecting engagement with the extended surface portions 38, 11, respectively, whereby the food processing unit will be secured in position on the base support means 10 for a food processing operation. However, the food processing unit is readily disassembled and removed from the base support means by merely removing the drive transfer belt 49 from the pulley means 23, 48 whereby the food processing unit can be moved laterally rightward, as shown in FIGS. 3 and 4, to disengage the socket portions 19, 37 from the surface engaging portions 11, 38.

Drive from the lower roller 41 is transferred to the upper roller 40 by means of a pair of conventional enmeshing gear drive means (not shown) which are fixed to a right extended end of the shaft 42, 43. Reference is made to applicant's above mentioned prior U.S. Pat. No. 3,238,950 for the details of construction of the enmeshing gear means for effecting opposite directions of rotations of the rollers 40, 41. In a shelling operation, roller 41 is driven in a clockwise direction as indicated by the arrow. A clockwise direction of rotation of roller 41 will effect a transfer of drive through the enmeshing gear means (not shown) to rotate roller 40 in a counterclockwise direction as indicated by the arrow.

Referring now particularly to FIG. 2, the food processing unit 30 includes a pea-directing chute 50. Chute 50 is formed integrally with the end member 34 and is bent to the left, as shown in FIG. 2, to present a downwardly and rearwardly inclined surface portion 51. Formed on the opposite lateral side edges of the inclined surface 51 are upturned guide portions 52. The upturned guide portions 52 extend upward an amount to sufficiently guide any peas being separated in a processing operation on to the downwardly inclined surface 51.

Peas which are separated in a processing operation are directed by the chute member 50 into a pea storage container 53. The pea storage container 53 is of a conventional pan-type construction providing an upwardly open reservoir means defined by a bottom 54, two upstanding side walls 55, 56 and two upstanding end walls 57, 58. Container 53 is detailed in dimensions to be readily received between the processing unit side walls 32, 33.

Referring now particularly to FIGS. 1, 2 and 4, the food processing apparatus of the present invention is provided with a feed tray means 60. The feed tray means 60 includes a downwardly inclined feed surface portion 61 and two upstanding side wall portions 62, 63. The two upstanding side wall portions 62, 63 terminate into an outwardly and downwardly formed lip portion 64, 65 to define therebetween socket receiving means 66, 67, respectively. The socket receiving means 66, 67 are detailed in dimensions to be readily received by the upstanding side walls 32, 33 in an assembled relationship as shown in FIGS. 2-4.

The upstanding side walls 62, 63 are detailed in dimension to position the downwardly inclined surface 61 in proper feeding relationship relative to the nip 46 formed between the operable pea shelling rollers 40, 41. In a proper assembled and aligned relationship, the downwardly inclined surface 61 of the feed tray means 60 terminates a short distance to the left of the operable pea shelling rollers 40, 41.

As shown in FIGS. 1 and 2, the feed tray means is provided with an inwardly formed notch 68. Notch 68 is detailed in dimensions to allow a pod vegetable contained on the feed tray surface portion 61 to be directed into the nip between the operable shelling rollers but will provide a space which will allow the shelled peas to drop from the pods onto the directing chute 51 for collection by the container means 53.

OPERATION

In a food processing operation, the apparatus of the present invention is assembled as shown in FIGS. 3 and 4 wherein the food processing unit 30 is supported on the base support means 10. In the supported and assembled relationship, the socket receiving portions 19, 37 are in engagement with the surface end portions 38, 11 of the base support means 10 and food processing unit 30, respectively. In the assembled relationship, the socket means 39, 37 will restrict the food processing unit to a single direction of a translation movement to the right, as shown in FIG. 4.

The food processing unit 30 is maintained in an operable position on the support base 10 by means of the power drive transfer belt 49. In the operable driving relationship, the power drive transfer belt 49 is in driving engagement with the pulley 23 of the motor means 20 and the pulley 48 of the operable roller pea shelling means 40, 41. After the food processing unit 30 has been positioned and operatively connected to the support base 10, the pea container means 53 is inserted into the food processing unit 30 between the side wall member 32, 33. In the insertion of the container means 53, the container must be angularly oriented whereby the upstanding end wall 58 will pass beneath the lower edge of the pea directing chute 51. After the end wall 58 has been allowed to pass beneath chute end wall 51, the container 53 can be lowered to a substantially horizontal receiving position, as shown in FIG. 4.

The pea directing chute does not extend the full distance between the end wall members 32, 33. The dimensions of the the pea directing chute 51 with upstanding guide members 52 are detailed in dimensions to allow peas dropping through the notch portion 68 of the feed tray means to be collected by the container 53. With the container in position on the processing unit 30, the feed tray means 60 is now positioned whereby the feed tray socket portion 66, 67 will be received by the upper surfaces of the side walls 32, 33.

As indicated above, when the feed tray means is properly positioned on the side wall support means 32, 33 the inclined surface 61 will be in alignment with the nip 46 formed between the operable shelling rollers 40, 41. Also, the notch portion 68 formed in the surface 61 of the feed tray means will be positioned above the pea directing chute 50 whereby a pea separated from a pod will drop thereon and be directed into the container 53.

After the food processing unit 30 has been properly assembled on the base support 10 and with the container 53 and feed tray means 60 positioned, as stated herein above, a pea shelling operation can be initiated. In operation, an amount of podded vegetables is placed on the feed tray means 60 and motor 20 is energized by the control switch means 24 to effect rotation of the rollers 40, 41 in an opposite direction as indicated by the arrows on FIG. 2. With the rollers driven in opposite direction of rotation, the podded vegetables contained on the feed tray means 60 are directed down inclined surface 61 to the nip 46 between rollers 40, 41. A podded vegetable such as peas passing through the nip between the rollers will be twisted due to the difference in peripheral surface speeds of the rollers. As a podded vegetable passes through the nip defined between the rollers 40, 41 the fruit contained in the pods will be separated therefrom as shown in FIG. 2. A separated pea will drop through the notch portion 68 onto the feed chute means and will be directed into the container 53. The hull of the podded vegetable from which the fruit has been removed will be drawn through the rollers and directed outward therefrom into separate collection means (not shown).

The elliptical cross-section construction of one of the rollers will improve the separating action performed by rollers 40, 41 whereby the peas contained in the pods will be separated therefrom in a more efficient and satisfactory manner due to the cyclically expandable and retractable nip.

Figure 5:
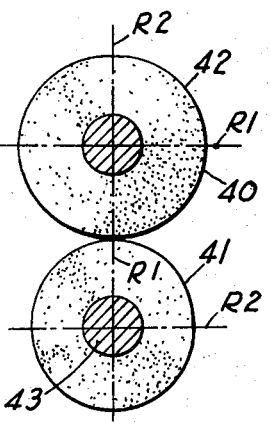
FIG. 5 is vertical sectional view of a modified form of roller shelling means.

As shown in FIG. 5, a modification of the roller construction is provided wherein each of the rollers is of elliptical cross-sectional configuration. In the modification as shown in FIG. 5, the rollers 40a and 41a are drivingly connected together whereby the long radius R–1 of one of the rollers is in angular alignment with a short radius R–2 of the second roller.

After a food processing operation, such as shelling peas, beans or the like, has been completed, the food processing unit 30 including container 53 and feed tray 60 is easily disassembled and removed from the support base 10 for a cleaning operation by merely removing the power drive transfer belt 49 and sliding the processing unit 30 rightward an extent to disengage the socket portions 19, 37 from the extended surface portion 38, 11.

Further, a second conventional food processing unit (not shown) such as a vegetable grinder can be provided which would have connecting elements complementary to the socket 19 and surface portion 11 whereby a second food processing unit can be readily and releasably mounted on the support base 10 to be driven by the power motor means 20. Construction of the base support means 10 whereby alternate forms of food processing units can be mounted thereon and driven by the motor means 20 will effectively reduce the overall cost of providing a number of food processing units capable of performing a variety of food processing operations.

It now becomes apparent that the above described illustrated embodiment is capable of obtaining the above stated objects and advantages. Further, it is obvious that those skilled in the art may make modifications in the details of construction without departing from the spirit of the invention which is to be limited only by the scope of the appended claims.

What is claimed is:
1. A food processing apparatus comprising, in combination:
   a. a base support means;
   b. releasable connectible means on said base support means;
   c. operable drive means supported on said base support means;
   d. an operable food processing unit, said food processing unit including operable driven means detailed for performing a processing operation on an edible food product;
   e. releasable connectible means on said food processing unit, said food processing unit connectible means detailed for complementary connecting engagement with said connectible means on said base support means whereby said food processing unit is maintained on said base support means and limited to one direction of movement relative thereto when in said connected relationship; and
   f. drive transfer means detailed for releasable driving engagement with said drive means on said base support means and said driven means on said processing unit for effecting a transfer of drive from said drive means to said driven means and whereby said drive transfer means is detailed to restrict said one direction of movement of said processing unit when in a connected driving relationship for maintaining said food processing unit on said base support means.

2. A food processing apparatus as described in claim 1 further characterized in that said drive means and said driven means include rotary driven elements and wherein said drive transfer means includes an endless member detailed for surrounding said rotary drive element and said rotary driven element.

3. A food processing apparatus as described in claim 1 further characterized in that said base support means connectible element include a recessed socket portion and an extending surface portion and wherein said connectible means of said processing unit include an extending surface portion and a recessed socket portion complementary to said base support socket portion and extended portion, respectively.

4. A food processing apparatus as described in claim 3 further characterized in that said complementary socket connecting portion and said extended connecting portion are detailed for maintaining said food processing unit on said base support means in such a manner as to restrict movement of said food processing unit relative to said base support means to said one direction of movement.

5. A food processing apparatus as described in claim 4 further characterized in that said base support means includes spaced guide means mounted thereon and detailed for guiding said food processing unit connectible means into position with said base support connectible means and whereby said guide means is detailed to restrict movement of said food processing unit relative to said base support means against two opposite directions of movement.

6. A food processing apparatus as described in claim 1 further characterized in that said food processing unit includes a pair of roller means supported thereon for rotation about parallel axes to define a nip therebetween and wherein said roller means are driven by said drive transfer means in opposite direction of rotation, said parallel roller elements detailed for effecting the removal of a pea from a pod in response to a pod being advanced through said nip between said roller means.

7. A food processing apparatus as described in claim 6 further characterized in that said food processing unit includes a feed tray means having an inclined surface and wherein means is provided for supporting said feed tray means on said food processing unit whereby pods of peas contained on said inclined surface will be directed to said nip defined between 6. A food processing pair of roller pea removal elements.

8. A food processing apparatus as described in claim 7 further characterized in that said food processing unit includes container means, and wherein said container means is supported on said food processing unit in a position to receive peas removed from said pod in a hulling operation.

9. A food processing apparatus as described in claim 6 further characterized in that one of said rollers is larger in diameter than said other roller.

10. A food processing apparatus as described in claim 6 further characterized in that at least one of said rollers is elliptical in cross-section whereby said nip between said pair of rollers is cyclically increased and decreased during a hulling operation.

11. A food processing apparatus as described in claim 6 further characterized in that each of said roller elements are elliptical in cross-section and wherein said pair of roller elements are drivingly connected together such that a long axis of one roller is in angular alignment with a short axis of a second roller.

12. A food processing apparatus as described in claim 7 further characterized in that said feed tray means includes formed recess portions detailed for complementary engagement with extended surface portions of said food processing unit and wherein said formed recess means and said surface portions are detailed for supporting said feed tray means in position whereby said incline surface of said feed tray means will be directed downwardly to said nip defined between said pair of rollers.

13. A food processing apparatus as described in claim 12 further characterized in that said feed tray means includes a notched portion formed in said incline surface means adjacent said pair of roller means whereby peas removed from said pods will be allowed to drop through said notched portion into said container means.

14. A food processing apparatus as described in claim 13 further characterized in that said food processing unit includes a chute means formed thereon and positioned below said feed tray notched portion for directing peas removed from said pods into said container means.

* * * * *